H. G. LELAND.
VIOLIN MOLD.
APPLICATION FILED MAR. 5, 1910.

1,133,482.

Patented Mar. 30, 1915.

WITNESSES:
Robert H. Kammler
Horace A. Crossman

INVENTOR.
Henry G. Leland.
BY Emery & Booth
ATTORNEYS.

UNITED STATES PATENT OFFICE.

HENRY G. LELAND, OF EAST BOSTON, MASSACHUSETTS.

VIOLIN-MOLD.

1,133,482.      Specification of Letters Patent.      Patented Mar. 30, 1915.

Application filed March 5, 1910. Serial No. 547,484.

*To all whom it may concern:*

Be it known that I, HENRY G. LELAND, a citizen of the United States, and a resident of East Boston, in the county of Suffolk, State of Massachusetts, have invented an Improvement in Violin-Molds, of which the following description, in connection with the accompanying drawings, is a specification, like letters on the drawings representing like parts.

This invention relates to violin molds for making violins, violas, violoncellos and other musical instruments of the violin class.

Figure 1:
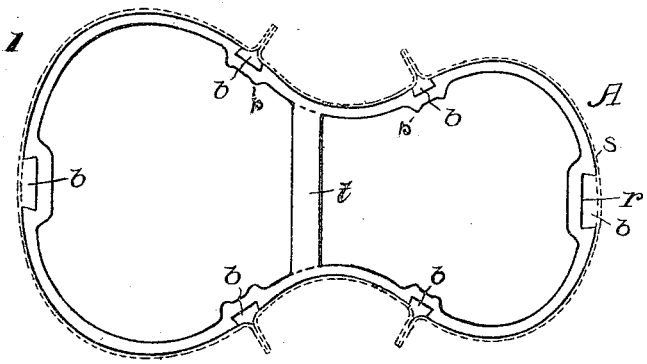
Figure 4:
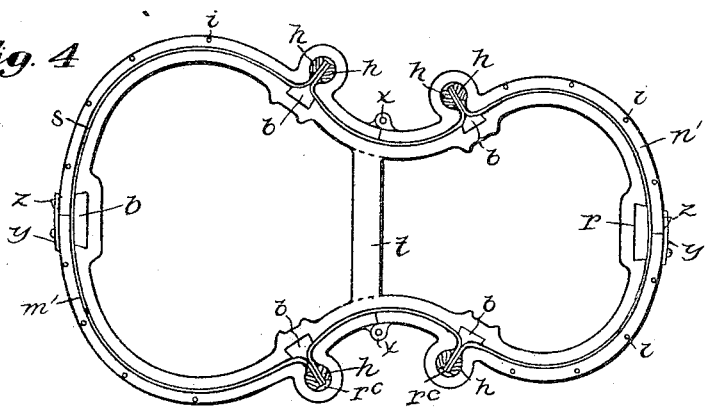
Figure 2:
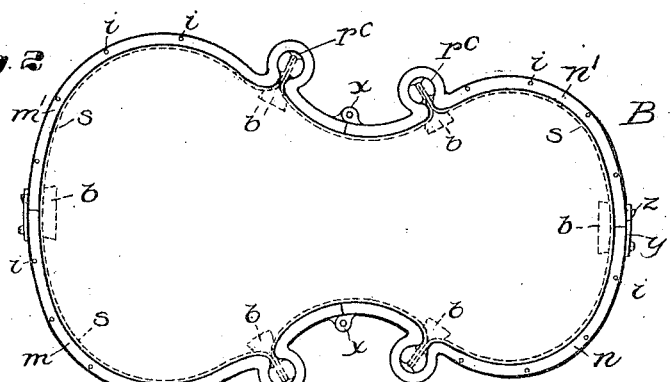
Figure 3:
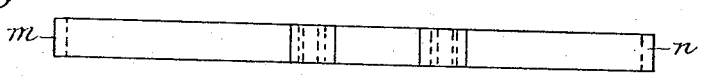

The character of the invention may be best understood by reference to the following description of an illustrative embodiment thereof shown in the accompanying drawing, wherein:

Figure 1 is a plan of a frame mold illustrated herein as embodying the invention; Fig. 2 is a plan of another frame mold; Fig. 3 is a side elevation of the mold shown in Fig. 2; and Fig. 4 is an assembled view of the molds shown in Figs. 1 and 2.

Referring to the drawings, the illustrative violin mold shown herein as embodying my invention comprises an inner mold A which may be in the form of a thin ribbon-like band or frame cast or otherwise formed to present an external contour conforming to the size and shape of the violin desired. The particular shape shown herein is known as the Stradivari, although it will be readily understood that the Guarnerius or other shapes may be used as desired. This band-like frame preferably should be made of a material which will not readily adhere to glue, cement or other adhesive. The metals are particularly well adapted for this use and in practice it is found that aluminum does not stick to the glue or other adhesive and at the same time is light and presents sufficient stiffness and rigidity to maintain its shape and is of a sufficient strength to permit a thin frame to be used. Heretofore, so far as I am aware, violin molds have been of a solid piece or pieces of wood which necessarily must be of considerable body or thickness in order to prevent warping or other distortions, but even so it is found in practice that wooden molds are not immune to these objections. Furthermore, with a thick or solid wooden mold such as referred to the side strips or ribs of the violin cannot be readily clamped to the mold throughout the extent of the strips but only at predetermined intervals according to the spacing of the clamp-receiving holes of the mold. One of the most difficult steps in the manufacture of a violin is to accurately form the side strips or ribs to conform to the mold. The side strips are of thin, pliable material and unless the greatest care is used in clamping them to the mold it will be found that one portion or portions of the strips will be secured to the mold while others will pucker, spring or draw away from the mold more or less. By the thin frame shown herein as embodying my invention the strips may be clamped at any point throughout their extent and may thereby be accurately held to and to conform to the mold.

In the usual violin the violin sides or ribs are not of one continuous piece but consist of six strips such as *s*. It is customary to unite the adjacent or adjoining ends of the strips by gluing or otherwise securing them to inside blocks. There are six such blocks including the neck block, end pin block and four corner blocks, the corners occurring at the bouts or indentations at the sides of the violin to facilitate the use of the bow. Another objection to the wooden mold referred to is that when the side strips are glued to the blocks the glue spreads beyond the blocks on to the mold and causes the strips to adhere to the mold. The strips may then be only removed either by cutting them from the mold or soaking them to dissolve the glue. In an attempt to prevent the strips from adhering to the mold adjacent the blocks the mold at such points has been waxed but this again is objectionable since some of the wax is apt to get on the blocks and thereby prevent the side strips from being glued or adhering thereto. To preliminarily position these blocks in order that the side strips may be subsequently bent on the frame and be secured to said blocks the illustrative frame mold A embodying my invention is provided with six recesses *r* which are spaced at intervals in the frame at positions corresponding to the neck, end pin and bout corners referred to and are adapted to receive the blocks *b* and hold the latter therein. Preferably these recesses are slightly dovetailed in order to effectually retain the blocks therein. It will be apparent that when dovetailed recesses are used the blocks may be pressed or slid therein transversely of the frame. The blocks *b* at the corners of the bouts taper outwardly and as a result tend to cause the clamps for holding the strips to the frame to slide thereon. In order that the clamps may not slide from their positions on said blocks, the frame may be provided with clamp-retaining elevations or projections $p$ on the interior of the frame adjacent the bout corner recesses.

The frame may be provided with a central transverse rib $t$ which operates to stiffen the frame and at the same time serves as a convenient handle for positioning the frame as more fully hereinafter described.

After the side strips have been bent to accurately conform to the contour of the mold and have been glued or secured to the blocks $b$, the mold may be removed and the usual linings or inside cleats may be glued or otherwise secured to the side ribs adjacent their upper and lower inner peripheries, whereupon the front and back of the violin may be then secured thereto.

Having described an inner mold I will now describe an outer mold B having some of the characteristics of the inner mold. This outer mold also consists of a thin band of metal or other non-adhesive material having an internal contour conforming to a violin shape. The outwardly curved meeting ends of the side strips $s$ at the bout corners are received by clamp recesses $r^c$ which are formed by bending, casting or otherwise forming loops in the band-like frame at points in said frame corresponding to said corners. The meeting ends of the strips will overlap within said recesses and may be securely retained by wedge half pins $h$ driven or pressed therein. The ribs are then bent into close conformity with the internal surface of the frame and held thereto by suitable clamps. The blocks $b$ may be then positioned at the meeting or adjacent ends of the side strips and glued or otherwise secured to said ends. The linings may be secured to the inner surfaces of said side strips while the latter are still in the mold and then either of the faces of the violin may be put on, and the mold removed, whereupon the other face may then be applied.

Not only may the inner mold A and outer mold B be separately used to form a violin, but they may be also used conjointly in combination for this purpose. When so used the side strips are placed about the inner mold as described and after they are so placed the inner mold is set into the outer mold (Fig. 4) and the inner mold is then removed thereby transferring the ribs from the outer surface of the inner mold to the inner surface of the outer mold. In thus transferring the side strips from the inner to the outer mold the side strips accurately maintain their shape and are held in the outer mold while the linings are glued to the inner sides of the ribs, it being apparent that the linings can not be placed on the inside of the ribs while the latter are on the exterior surface of the inner mold. After the inner mold is removed and the linings secured in place the front and back of the violin may be applied as before in the case of the outer mold.

If desired, the outer mold may be made in sections. Herein this mold consists of four sections, $m, m'$ and $n, n'$. The side sections may be jointed or hinged at central points $x$ of the bouts and may be secured together by clamps or other suitable means, herein shown in the form of latches $y$ of resilient material on two of the sections, said latches being adapted to snap over lugs $z$ on the adjacent sections. It will be apparent that by hinging the side sections of the frame centrally within said bouts that when said sides are swung back the clamp recesses $r^c$ referred to will swing in such a direction as to permit their ready withdrawal from the overlapped ends of the meeting side strips at the corners of the bouts.

One of the great advantages of the sectional frame is that the mold does not need to be removed until the sides and also the front and back of the violin are completely formed and assembled it being merely necessary to unlatch the frame whereupon the sections may readily swing on their hinges and be readily removed without in any way interfering with the violin. It will be apparent that by leaving the mold on the violin until after it is formed, as described, the ribs are positively maintained in place with absolute accuracy in conformity with the mold and are maintained perpendicular to the front and back of the violin. It will be apparent that the absolute certainty of accuracy thus obtained is of great importance in making violins, since the minutest details of dimension, proportion and relation of parts are important in the production of a perfect violin.

A sectional construction of the outer mold is of further advantage when inner and outer molds are used in combination, since if desired, the outer mold may be used to clamp the side strips or ribs to the outer surface of the inner mold and thereby eliminate the necessity of using separate clamps for this purpose. When the outer mold is thus used the ribs will be shaped with absolute certainty and held throughout their extent to the inner mold.

To accurately position the front and back of the violin on the ribs the outer frame may be provided with a series of holes $i$, herein extending transversely through the frame, said holes being adapted to receive suitable pins or guides for accurately guiding the front and back of the violin in place and contributing to the maintenance of their positions until they are permanently glued or otherwise secured to said ribs.

Another advantage of the outer frame consists in the certainty of producing a violin of proper size irrespective of the thickness of material in the side strips used.

By my invention is provided a violin mold which is simple in construction and use, whereby violins may be more readily, quickly and accurately made than by any means known to me.

Having described one embodiment of my invention, without limiting myself thereto, what I claim as new and desire to secure by Letters Patent is:

1. A mold for making violins comprising a rib forming frame of ribbon-like material having a permanent internal contour conforming to the shape of the ribs of a violin said frame being recessed at intervals to receive rib uniting blocks.

2. A mold for making violins comprising a rib forming frame of ribbon material having a permanent internal contour conforming to a violin shape and having clamp recesses for receiving adjoining ends of the ribs of the violin.

3. A device for making violins comprising a ribbon-like mold having a contour conforming to a violin shape and having clamp recesses formed for receiving the bout ends of the violin side strips.

4. A device for making violins, comprising an inner mold having a contour conforming to a violin shape and adapted to receive violin side strips or ribs exteriorly thereof and an outer mold having a similar contour and sufficiently large to contain said inner mold with its side strips thereon, whereby the sides thus formed may be transferred from said inner to said outer mold to permit the application of linings to the interior sides of said strips.

5. A mold for making violins, comprising outer and inner frames shaped to conform to the contour of a violin and adapted to permit the transfer of the ribs of a violin formed on one to another.

6. A mold for making violins comprising a thin, rib forming frame of a width substantially equal to the width of the ribs of the violin and having a contour conforming to said ribs, recesses in said frame at intervals to receive rib uniting blocks, and clamp containing projections adjacent said recesses.

7. In a mold for making violins, comprising a thin, rib forming frame, having a contour conforming to a violin shape and provided with means for positioning the front or back of the violin.

8. A mold for making violins, comprising a thin, rib-forming ribbon-like frame, having a contour conforming to a violin shape and provided with dovetailed recesses to receive side-strip-uniting blocks.

9. A mold for making violins comprising a thin band-like frame having a permanent contour of a width corresponding to that of the ribs of a violin and having provision for positioning the front and back of the violin.

In testimony whereof, I have signed my name to this specification, in the presence of two subscribing witnesses.

HENRY G. LELAND.

Witnesses:
 HENRY T. WILLIAMS,
 EVERETT S. EMERY.